United States Patent

Tangorra

[11] Patent Number: 4,583,621
[45] Date of Patent: Apr. 22, 1986

[54] DIFFERENTIATED ACTION OSCILLATION DAMPING DEVICE

[75] Inventor: Giorgio Tangorra, Monza, Italy
[73] Assignee: Industrie Pirelli S.p.A., Milan, Italy
[21] Appl. No.: 590,749
[22] Filed: Mar. 19, 1984

[30] Foreign Application Priority Data

Apr. 8, 1983 [IT] Italy ............................. 20502 A/83

[51] Int. Cl.⁴ .............................................. F16F 7/12
[52] U.S. Cl. ....................................... 188/67; 188/268; 188/281
[58] Field of Search ............... 188/67, 268, 271, 281, 188/381, 265; 267/134; 70/181; 74/531

[56] References Cited

U.S. PATENT DOCUMENTS

| | | | |
|---|---|---|---|
| 312,400 | 2/1885 | Stanford | 188/67 |
| 346,784 | 8/1886 | Stanford | 188/67 X |
| 3,696,891 | 10/1972 | Poe | 188/268 |
| 3,820,634 | 6/1974 | Poe | 188/268 |

FOREIGN PATENT DOCUMENTS 965868 8/1964 United Kingdom .

*Primary Examiner*—Bruce H. Stoner, Jr.
*Assistant Examiner*—Richard R. Diefendorf
*Attorney, Agent, or Firm*—Stevens, Davis, Miller & Mosher

[57] ABSTRACT

An oscillation damping device having a differentiated action in the two directions of sliding of a rigid stem with respect to a rigid case, comprising a plurality of rigid rolling elements, interposed between a rolling race of viscoelastic material and one or more skidding metallic races, shaped in such a way that upon moving the stem in one direction, the rolling elements are encased within said metallic races, spaced out from the viscoelastic race and exert a limited braking effect, while upon moving the stem in the opposite direction, the rolling elements are advanced into interference with the viscoelastic race and thereby exert a strong braking effect.

5 Claims, 12 Drawing Figures

U.S. Patent   Apr. 22, 1986   Sheet 1 of 3   4,583,621
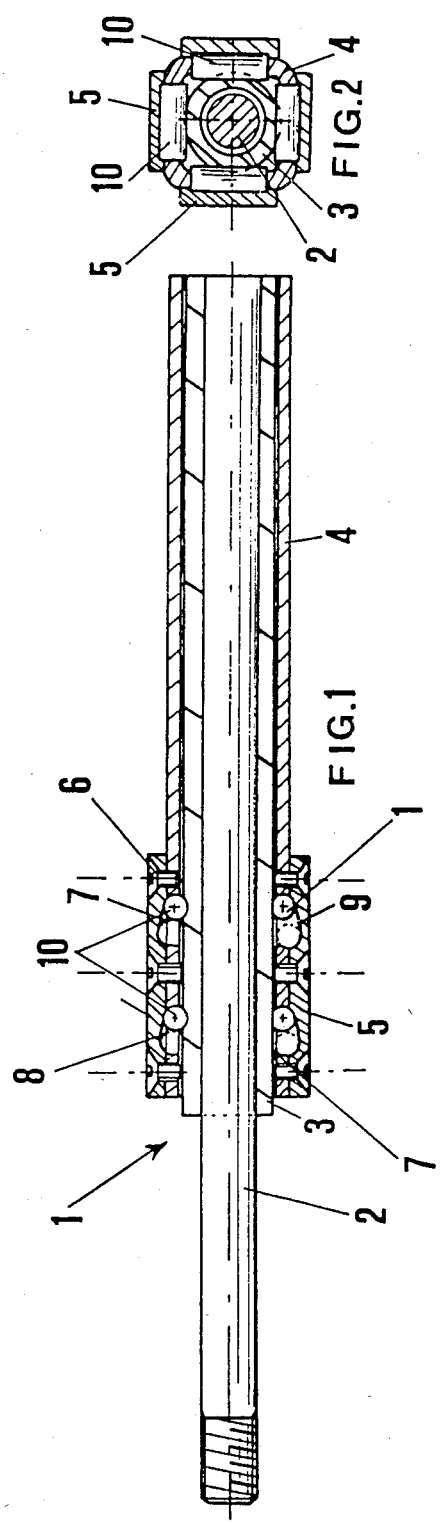
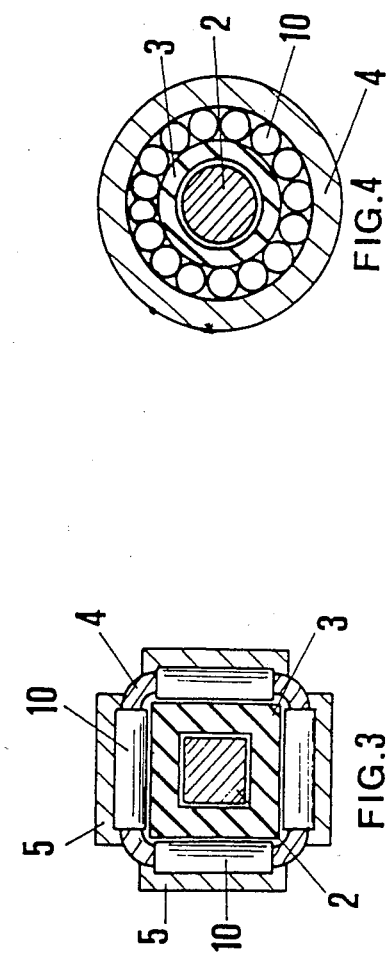

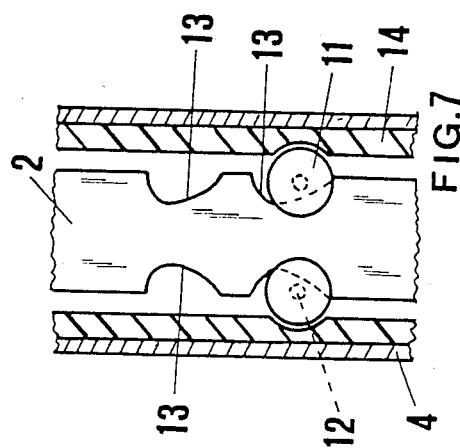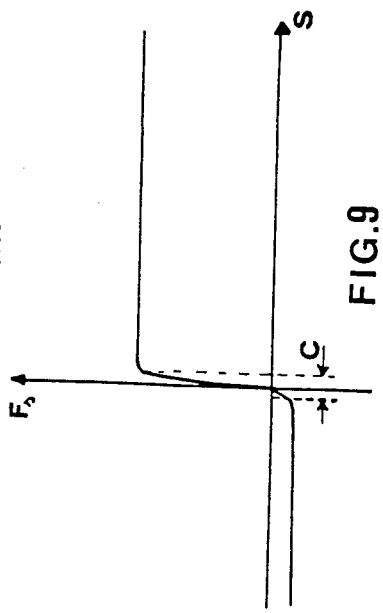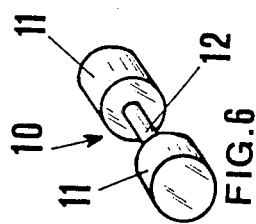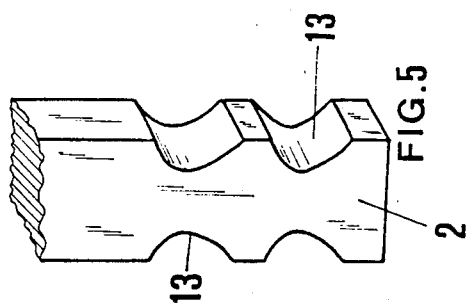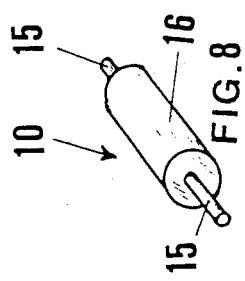

DIFFERENTIATED ACTION OSCILLATION DAMPING DEVICE

DESCRIPTION

The object of the present invention is a damping device, particularly for motor vehicles, trucks, washing-machines and the like, having a differentiated action in the two sliding directions, comprising a plurality of rigid rolling elements, interposed between a rolling race of viscoelastic material and a skidding metallic race, properly shaped.

The Italian Patent Application No. 20 050 A/62, filed Jan. 31, 1962 in the name of Societa Applicazionio Antivibranti "SAGA" S.p.A., represents the most pertinent known technique with respect to the invention of the present application.

The cited Italian patent application discloses an energy dissipator comprising rigid rolling elements, interposed between rolling races of viscoelastic material, and provided with such a relative movement as to make the rolling elements rotate, which causes deformation of the viscoelastic material with consequent dissipation of energy. Therefore, it becomes necessary to provide cooling oils to maintain at admissible temperatures the rigid rolling elements which tend to get warm, and to facilitate the elimination of heat toward the outside. The lack of cooling oil between the two viscoelastic rolling races may cause inadmissible wear and tear, with consequent unserviceability of the whole device.

The presence of the cooling oils makes the device more complicated, with consequent increase in costs, because of the need for seals, feeding lines, etc.

Among the various embodiments of the dissipating device according to the cited Italian Application No. 20 050 A/62, the FIG. 13 attached to the application shows a shock absorber in which the stem and the case are cone-shaped and have the same draft, so as to dampen the oscillations in differentiated manner in the two directions of sliding of the stem with respect to the case. But such a solution does not permit one to have a strongly differentiated action in the two sliding directions, for instance a free or very nearly free sliding in one direction and a strong braking effect in the opposite direction.

These and other drawbacks are overcome by the oscillation damping device of the present invention.

A first aim of the present invention is that of realizing an oscillation damping device that is able to supply in any case a differentiated action in the two sliding directions.

A second aim of the invention is that of eliminating the presence of cooling oils between the rolling or sliding faces of the rolling elements, thus simplifying the design and construction of the device.

A further aim of the invention is that of being able to replace in an easy manner any part of the device that might become damaged, without the need to replace the whole device.

In order to achieve these aims, the oscillation damping device of the present invention, which is of the type comprising a stem sliding axially in the two directions with respect to a fixed case, is characterized by providing a plurality of rigid rolling elements interposed between a rolling race of viscoelastic material and a skidding or sliding race of metallic, or in any case rigid, material, consisting of a cavity having a gradually increasing depth, so that when the stem slides in one direction, the rolling elements located in the deepest part of the cavity will exert a limited braking effect, while when the stem slides in the opposite direction, the rolling elements, rolling on the viscoelastic race place in the least deep part of the cavity, will effect thus a strong braking effect for embedding in the viscoelastic material.

In a preferred embodiment of the device according to the present invention, the rolling race of viscoelastic material covers the said stem, while the skidding or sliding race or races of rigid material are fixed to the case, with, if desired, the possibility of a regulation of their radial distance with respect to the stem.

The rigid elements can be rollers, needles, balls or the like.

These and other characteristics and features of the invention will appear still more clearly from the following detailed description, referred to embodiments made by way of nonlimiting example, and with reference to the accompanying drawings in which:

FIG. 1 is an axial section of the damping device according to the present invention in its preferred embodiment;

FIG. 2 is a transverse section of the device shown in FIG. 1;

FIG. 3 is a transverse section similar to that shown in FIG. 2, but with some alternative embodiments;

FIG. 4 is also a transverse section of the device according to the invention, wherein the rigid rolling elements are balls interposed between cylindrical surfaces;

FIG. 5 is a part of the skidding or sliding races provided, in this case, on the stem;

FIG. 6 shows a different embodiment of the rigid rolling elements;

FIG. 7 shows, partially in section, a still different embodiment of the damping device according to the invention, using the stem of FIG. 5 and the rolling elements of the type shown in FIG. 6;

FIG. 8 shows a further embodiment of the rolling elements;

FIG. 9 is a diagram made by way of example by a typical path movement-damping force, stressing the differentiated action of the damping device according to the invention.

Figure 10:
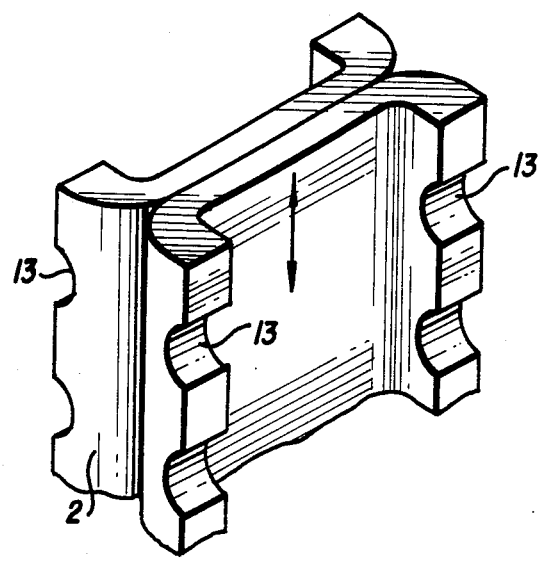
FIGS. 10-12 illustrate, partially in section, a damping device according to the invention using the rolling element of FIG. 8.

First, with reference to FIG. 1 showing a preferred embodiment of the invention, reference numeral 1 indicates the damping device of the present invention as a whole.

Said damping device is made up of a rigid stem 2 provided with a covering 3 of viscoelastic material, preferably a conventional nitrile rubber, and surrounded by a rigid case or shell 4 in which said stem can slide axially in the two directions. Plates 5, for instance four plates, one for each side, are fixed via screws 6 to the rigid case 4, which in FIG. 2 is shown as having a square section.

The fastening of the plates 5 is such as to permit the regulation of their radial distance with respect to the viscoelastic covering 3.

The case 4 is provided with holes 7 corresponding respectively to cavities 8 in the plates 5, whose profiles 9 are all inclined in the same direction with respect to a horizontal plane (FIG. 1).

In the cavities 8 of the plates 5, there are arranged rigid rolling elements 10 that, in the embodiments of FIGS. 1 and 2, are rollers. The rigid rolling elements 10 are thus interposed between a viscoelastic surface 3 and a rigid surface, preferably metallic, constituted by the profile 9 of a cavity 8 provided in the plate 5. When the stem 2 is moved axially with respect to the case 4, the rollers 10 roll on a rolling race of viscoelastic material constituted by the covering 3 of the stem itself, and skid or slide on a metallic race constituted by the profile 9 of the corresponding cavity 8.

More precisely, with reference to FIG. 1, when the stem 2 is moved toward the left, the rollers 10 are arranged in the deepest zone of the cavities 8, as shown with dashed lines, thereby exerting a limited braking effect and facilitating therefore the sliding between the elements 2 and 4. On the other hand, when the stem 2 is moved toward the right, the rolling elements 10 roll on the viscoelastic races 3 and are disposed in the narrowest part of the cavity 8, as shown with continuous lines in FIG. 1, thereby interfering with the viscoelastic material itself and exerting therefore a strong braking effect.

In the embodiment of FIG. 1, the profile 9 of the cavities 8 determine such a differentiated action of the damping effect as to permit the free or nearly free sliding of the stem 2 toward the left, but to exert a strong braking effect for sliding of the stem 2 toward the right.

In the diagram of FIG. 9, where there are shown the damping forces (as ordinates) in relation to the movements from the static preload condition (as abscissae), the abovesaid effect is clearly stressed. In fact, owing to movements of the stem 2 toward the left (negative abscissae) the damping force is very low, while owing to movements toward the right (positive abscissae) the damping force is very much higher. The passage between the maximum values of the damping force takes place in a very short interval of the movements, corresponding to the block run of each roller, i.e., to the run that each roller makes inside the corresponding cavity 8 to go in the furthermost positions indicated with continuous and dashed lines, respectively, in FIG. 1.

Of course, the differentiated damping action in the two directions of sliding of the stem 2 with respect to the case 4 can be changed, both by changing the profile 9 of the cavities 8 and by regulating the distance of the plate 5 from the stem 2 via the screws 6.

A great advantage of the damping device according to the present invention is that the power transformed into heat, lost in consequence of the hysteresis of the viscoelastic material of the rolling races 3, and which is proportional to the sum of the partial products of the braking forces of the rollers 10 for the axial movements, is dissipated in the surrounding structure via the metallic plates 5. In this way the rollers 10 remain at fairly low temperatures, and therefore in the zone between the races and the rollers the presence of cooling oil is not required. At most, only a normal degreasing operation is required.

In FIG. 2, showing a cross-section of the device of FIG. 1, the rigid stem 2 has been shown with a circular section and the viscoelastic covering 3 has also been shown with a circular profile.

In FIG. 3, the stem 2 has instead a square section and the viscoelastic covering 3 has the same quadrangular profile. By means of this design the braking effect is increased, since the contacting zone between the rollers 10 and the rolling race 3 increases.

In the embodiment of FIG. 4, all the elements forming the damping device have a circular section and the rigid rolling elements 10 are made up of balls whose axes, perpendicular to the plane of the figure, are arranged on a cylindrical surface. The rolling elements 10 are always interposed between a rolling race 3, covering the stem 2, and a metallic skidding or sliding race that may be provided directly inside the case 4, as shown in the Figure or, if desired, in an auxiliary cage.

Now referring to FIGS. 5, 6 and 7, there is shown a further embodiment of the differentiated action oscillation damping device of the present invention.

In this arrangement the rigid rolling elements 10, of which only one is shown in FIG. 6, comprise two end rollers 11, rigidly connected, axially to each other, by means of a rod 12. The stem 2, having a square or rectangular section, has on at least two opposite faces, grooves whose profiles 13 perform the same function as the profiles 9 in the embodiment of FIG. 1. When installed (FIG. 7), the connecting rod 12 slides on the profiles 13 of the rigid element 2, while the rollers 11 roll on the races 14 of viscoelastic material arranged inside the rigid case, still indicated by the reference numeral 4.

By this type of construction, there are obtained the same results as those described above, as well as a "sweetness" or smoothness of operation, due to the increase in the ratio between the radius of the rolling parts and the radius of the sliding parts of the rolling elements 10.

FIG. 8 shows a further embodiment of the rolling elements 10, consisting of a roller 16 provided axially with projecting rods 15. When installed, the rods 15 slide on metallic races, while the roller 16 rolls on a viscoelastic race. Although not shown in the accompanying Figures, the construction can be easily imagined from this verbal description.

Figure 11:
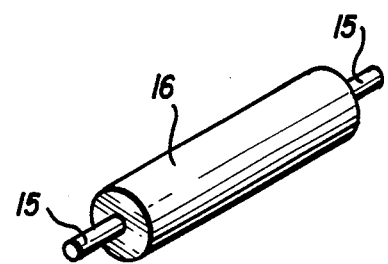
Figure 12:
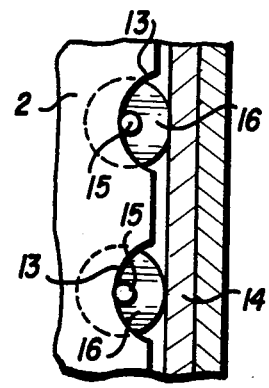

FIGS. 10-12 illustrate a damping device according to the invention using the rolling element illustrated in FIG. 8. Rods 15 of the rolling elements slide on metallic races 13, while roller 16 rolls on viscoelastic race 14.

Also, with reference to FIG. 1, it can be noted how the rod 2, together with the viscoelastic covering 3, can be easily replaced in case of wear and tear of the viscoelastic material itself.

According to a still further embodiment, the rod 12 of FIGS. 6 and 7 may be of any section entirely flattened out so as to become flexible; for instance, it may be provided with a rubberized steel sheet.

Moreover, the rolling and skidding races may be reversed with respect to what has been described, i.e., the skidding races may be associated with the stem 2 and the rolling race associated with the case 4.

What is claimed is:

1. An oscillation damping device having a rigid case and a rigid stem axially movable relative to the rigid case, said device having a differentiated sliding action relative to two directions of axial movement of said rigid stem relative to said rigid case, said device comprising:
    a plurality of viscoelastic races;
    a plurality of metallic races opposed to said viscoelastic races, said metallic races comprising grooves, said grooves having a deepest part and a shallowest part;
    a plurality of rigid rolling elements each having at least one roller with at least one axially projecting rod, said axially projecting rod having a smaller radius than a radius of said roller;

said projecting rod being disposed to slide on one said groove of said metallic races and said roller being disposed to roll on one said viscoelastic race;

whereby when said stem is moved on one axial direction, said roller is disposed in said deepest part of said one groove to facilitate said sliding action and when said stem is moved in an opposite axial direction, said roller rolls on said one viscoelastic race to become disposed in said shallowest part of said one groove to inhibit said sliding action by viscoelastic interference of said one viscoelastic race to apply a strong braking effect on said axial movement.

2. A damping device as in claim 1, wherein each said rolling element comprises at least two end said rollers rigidly connected to each other by a said axially projecting rod.

3. A damping device as in claim 2, wherein said stem has a rectangular cross-section, opposite faces of said stem comprise said grooves of said metallic races, said rigid case includes inside faces opposite to said opposite faces of said stem, and said inside faces comprise said viscoelastic races.

4. A damping device as in claim 1, wherein said roller comprises opposite ends each having a said axially projecting rod, each axially projecting rod being disposed to slide on a said metallic race and said roller being disposed to slide on a said viscoelastic race.

5. A damping device as in claim 4, wherein said stem comprises said metallic races and said case includes said viscoelastic races in an interior portion thereof.

* * * * *